United States Patent
Burrowes et al.

(10) Patent No.: US 7,060,933 B2
(45) Date of Patent: Jun. 13, 2006

(54) METHOD AND LASER SYSTEM FOR PRODUCTION OF LASER-INDUCED IMAGES INSIDE AND ON THE SURFACE OF TRANSPARENT MATERIAL

(75) Inventors: Dirk Burrowes, Ashburnham, MA (US); Igor Troitski, 853 Arrowhead Trl., Henderson, NV (US) 89015

(73) Assignee: Igor Troitski, Henderson, NV (US)

( * ) Notice: Subject to any disclaimer, the term of this patent is extended or adjusted under 35 U.S.C. 154(b) by 31 days.

(21) Appl. No.: 10/862,869

(22) Filed: Jun. 8, 2004

(65) Prior Publication Data
US 2005/0269301 A1 Dec. 8, 2005

(51) Int. Cl.
B23K 26/00 (2006.01)
B23K 10/00 (2006.01)

(52) U.S. Cl. ............... 219/121.69; 219/121.68

(58) Field of Classification Search ........... 219/121.68, 219/121.69, 121.41, 121.44, 121.46; 264/400, 264/455, 482, 483
See application file for complete search history.

(56) References Cited

U.S. PATENT DOCUMENTS

| | | | | |
|---|---|---|---|---|
| 4,092,518 A * | 5/1978 | Merard | ............... | 219/121.85 |
| 4,843,207 A * | 6/1989 | Urbanek et al. | ......... | 219/121.6 |
| 5,206,496 A * | 4/1993 | Clement et al. | ............. | 250/271 |
| 5,575,936 A * | 11/1996 | Goldfarb | ............... | 219/121.68 |
| 5,637,244 A * | 6/1997 | Erokhin | ................. | 219/121.69 |
| 5,656,186 A * | 8/1997 | Mourou et al. | ........ | 219/121.69 |
| 5,886,318 A * | 3/1999 | Vasiliev et al. | ........ | 219/121.69 |
| 6,087,617 A * | 7/2000 | Troitski et al. | .......... | 219/121.6 |
| 6,333,485 B1 * | 12/2001 | Haight et al. | .......... | 219/121.68 |
| 6,333,486 B1 * | 12/2001 | Troitski | ................. | 219/121.69 |
| 6,399,914 B1 * | 6/2002 | Troitski | ................. | 219/121.69 |
| 6,417,485 B1 * | 7/2002 | Troitski | ................. | 219/121.69 |
| 6,426,480 B1 * | 7/2002 | Troitski | ................. | 219/121.69 |
| 6,490,299 B1 * | 12/2002 | Raevsky et al. | .............. | 372/10 |
| 6,509,548 B1 * | 1/2003 | Troitski | ................. | 219/121.69 |
| 6,605,797 B1 * | 8/2003 | Troitski | ................. | 219/121.69 |
| 6,630,644 B1 * | 10/2003 | Troitski et al. | ........ | 219/121.69 |
| 6,664,501 B1 * | 12/2003 | Troitski | ................. | 219/121.69 |
| 6,670,576 B1 * | 12/2003 | Troitski et al. | ........ | 219/121.69 |
| 6,720,521 B1 * | 4/2004 | Troitski | ................. | 219/121.68 |

(Continued)

FOREIGN PATENT DOCUMENTS

JP 5-309489 A * 11/1993

(Continued)

OTHER PUBLICATIONS

Troitski, System creation of laser-induced damage images and problems of their optimization, Proc. of SPIE, vol. 3902 (2000), 489-499.*

(Continued)

Primary Examiner—Geoffrey S. Evans

(57) ABSTRACT

A method and an apparatus for creating laser-induced images inside transparent materials and on their surfaces are disclosed. The method is founded on the production of etch points by creating breakdowns at the predetermined points inside transparent material and by creating breakdowns at the predetermined points of the air or another environment. Mark areas on the transparent material surfaces are the frost areas and a surface image is an arrangement of the frost areas of different density. Such frost areas on the surface of a transparent material are produced by the plasma generated during breakdowns. A method and a system for controlling characteristics of plasma generated during breakdowns for controlling the parameters of the frost areas arisen under interaction of the plasma with the surface of the transparent material are disclosed.

6 Claims, 2 Drawing Sheets

U.S. PATENT DOCUMENTS

| | | | |
|---|---|---|---|
| 6,720,523 B1* | 4/2004 | Troitski | 219/121.69 |
| 6,727,460 B1* | 4/2004 | Troitski | 219/121.68 |
| 6,734,389 B1* | 5/2004 | Troitski | 219/121.69 |
| 6,740,846 B1* | 5/2004 | Troitski | 219/121.69 |

FOREIGN PATENT DOCUMENTS

| | | | |
|---|---|---|---|
| JP | 6-155920 A | * | 6/1994 |
| JP | 10-230377 A | * | 9/1998 |
| SU | 321422 | * | 11/1970 |

OTHER PUBLICATIONS

Troitski. Experience of creation of laser-induced damage images. Proc. of SPIE, vol. 3902 (2000), 479-488.*

Troitski, Image recording by laser-induced damages, Optical Memory and Neural Networks, vol. 9, No. 4, 2000.*

* cited by examiner

METHOD AND LASER SYSTEM FOR PRODUCTION OF LASER-INDUCED IMAGES INSIDE AND ON THE SURFACE OF TRANSPARENT MATERIAL

FIELD OF THE INVENTION

The present invention relates to a method and apparatus for producing laser-induced images inside transparent materials and on their surface by using breakdown phenomenon.

BACKGROUND OF THE INVENTION

A number of techniques for creating a variety of patterns on the surface and inside of transparent substrates using pulsed laser radiation are well known.

One publication disclosing such techniques is the Russian invention #321422 to Agadjanov et. al., published on Nov. 16, 1970 (#140454529-33). The invention concerns a method of manufacturing decorative products inside a transparent material by changing the material structure by laser radiation. As disclosed, by moving a material relative to a focused laser beam, it is possible to create a drawing inside the material.

U.S. Pat. No. 4,092,518 to Merard discloses a method for decorating transparent plastic articles. This technique is carried out by directing a pulsed laser beam into the body of an article by successively focusing the laser beam in different regions within the body of the article. The pulse energy and duration is selected based upon the desired extent of the resulting decorative pattern. The effect of the laser is a number of three dimensional "macro-destruction" (fissures in the material of the article) appearing as fanned-out cracks. The pattern of the cracks produced in the article is controlled by changing the depth of the laser beam focus along the length of the article. Preferably, the article is in the form of a cylinder, and the cracks are shaped predominantly as saucer-like formations of different size arranged randomly around the focal point of the optical system guiding a laser beam. The device used to carry out this technique is preferably a multi-mode solid-state, free-running pulse laser used in conjunction with a convergent lens having a focal length from 100 to 200 mm.

U.S. Pat. No. 4,843,207 to Urbanek et al. discloses a method of creating controlled decorations on the surface of a hollow symmetrical transparent article. This technique is preferably carried out on glass. The glass is preconditioned with a coating on the outer surface of the glass being approximately 1.2 mm thick and made of a material having at least 75% absorption of laser radiation. The technique is also carried out using a laser having a wave of length of 0.5 to 2 microns acting upon the external coating through the wall of the cylindrical glass article. The laser beam moves so that it is focused on the surface of the cylinder, and moves about the axis of symmetry of the cylinder to irradiate the aforementioned surface coating. As a result, the irradiated portions of the surface coating go through a phase change and a pattern is formed.

U.S. Pat. No 5,206,496 to Clement et al. discloses a method and apparatus for providing in a transparent material, such as glass or plastic, a mark which is visible to the naked eye or which may be "seen" by optical instruments operating at an appropriate wavelength. The Clement et al. Patent describes a method and apparatus for producing a subsurface marking which is produced in a body such as bottle, by directing into the body a high energy density beam and bringing the beam to focus at a location spaced from the surface, so as to cause localized ionization of the material. In the preferred embodiment the apparatus includes a laser as the high energy density beam source. The laser may be a Nd-YAG laser that emits a pulsed beam of laser radiation with a wavelength of 1064 nm. The pulsed beam is incident upon a first mirror that directs the beam through a beam expander and a beam combiner to a second mirror. A second source of laser radiation in the form of a low power He—Ne laser emits a secondary beam of visible laser radiation with a wavelength of 638 m. The secondary beam impinges upon the beam combiner where it is reflected toward the second reflecting surface coincident with the pulsed beam of laser radiation from the Nd-YAG laser. The combined coincident beams are reflected at the reflecting surface via reflecting two other surfaces to a pair of movable mirrors for controlling movement of the beam. The beam then passes through a lens assembly into the body to be marked.

U.S. Pat. No. 5,575,936 to Goldfarb discloses a process and apparatus where a focused laser beam causes local destruction within a solid article, without affecting the surface thereof. The apparatus for etching an image within a solid article includes a laser focused to a focal point within the article. The position of the article with respect to the focal point is varied. Control means, coupled to the laser, and positioning means are provided for firing the laser so that a local disruption occurs within the article to form the image within the article.

U.S. Pat. No 5,637,244 to Erokhin discloses a technique which depends on a particular optical system including a diffraction limited Q-switched laser (preferably a solid-state single-mode $TEM_{00}$) aimed into a defocusing lens having a variable focal length to control the light impinging on a subsequent focusing lens that refocuses the laser beam onto the transparent article being etched. The laser power level, operation of the defocusing lens, and the movement of the transparent article being etched are all controlled by a computer. The computer operates to reproduce a pre-programmed three-dimensional image inside the transparent article being etched. In the computer memory, the image is presented as arrays of picture elements on various parallel planes. The optical system is controlled to reproduce the stored arrays of picture elements inside the transparent material. A method for forming a predetermined half-tone image is disclosed. Accordance to the method, microdestructions of a first size are created to form a first portion of the image and microdestruction of a second size different from the first size are created to form a second portion of the image. Different sizes of microdestructions are created by changing the laser beam focusing sharpness and the radiation power thereof before each shot.

U.S. Pat. No. 5,886,318 to A. Vasiliev and B. Goldfarb discloses a method for laser-assisted image formation in transparent specimens which consists in establishing a laser beam having different angular divergence values in two mutually square planes. An angle between the plane with a maximum laser beam angular divergence and the surface of the image portion being formed is changed to suit the required contrast of an image.

U.S. Pat. No. 6,333,485 to Haight, et al. discloses method for minimizing sample damage during the ablation of material using a focused ultrashort pulsed beam. In one aspect the invention provides a method for laser induced breakdown of a material with a pulsed laser beam where the material is characterized by a relationship of flounce breakdown threshold versus laser beam pulse width that exhibits an abrupt, rapid, and distinct change or at least a clearly detectable and distinct change in slope at a predetermined laser pulse width value.

U.S. Pat. No. 5,656,186 to Mourou, et al. and Related U.S. Patent Documents RE 37,585 disclose method for laser induced breakdown of a material with a pulsed laser beam where the material is characterized by a relationship of fluence breakdown threshold versus laser beam pulse width that exhibits an abrupt and rapid.

U.S. Pat. No. 6,087,617 to Troitski et al. discloses a computer graphic system for producing an image inside optically transparent material. An image reproducible inside optically transparent material by the system is defined by potential etch points, in which the breakdowns required to create the image in the selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the distortion of the reproduced image due to the refraction of the optically transparent material, the coordinates of the generated etch points are adjusted to correct their positions along a selected laser beam direction.

U.S. Pat. No. 6,333,486 to Troitski discloses a method for production of etch points inside transparent material, which have the same size but different brightness. Laser-induced damages produced by this method provide the reproduction of image gradation without changing of their spatial resolution.

U.S. Pat. No. 6,399,914 to Troitski discloses a method for producing laser-induced images inside the special transparent material containing special kinds of impurities, which decrease the damage threshold of the material that provides creation of small and without star structure laser-induced damages.

U.S. Pat. No. 6,417,485 to Troitski discloses a method and laser system for producing laser-induced damages inside transparent materials by controlling breakdown process development. At the beginning an applied laser radiation level just exceeds an energy threshold for creating a plasma condition inside the transparent material, and thereafter the energy level of the applied laser radiation is just maintain the plasma condition and is applied before the plasma condition extinguished, but after a shock wave associated therewith has passed.

U.S. Pat. No. 6,426,480 to Troitski discloses a method and system for producing single layer laser-induced damage portrait inside transparent material which are based on generation of small smoothed etch points of determined sizes and on control of their brightness without variation of their determined sizes.

U.S. Pat. No. 6,490,299 to Raevski et al. discloses method and laser system producing high quality laser-induced images inside transparent materials by using specific laser radiation generated by serial combination of both generation regims: a Q-switched mode and a free-running mode.

U.S. Pat. No. 6,509,548 to Troitski discloses a method and apparatus for producing high-resolution laser-induced damage images inside transparent materials by small etch points. The method is based on generation of the initial electron density in the relatively large volum, creation of the breakdown at a small part of the said volume and control of the energy amount enclosed inside the plasma.

U.S. Pat. No. 6,605,797 to Troitski discloses laser-computer graphics systems for producing images such as portraits and 3-D sculptures formed from laser light created etch points inside an optically transparent materials. The produced image has a high resolution like a computer graphic image from which it is derived, little fluctuation in gray shades, and has no discernable point structure.

U.S. Pat. No. 6,630,644 to Troitski et al. discloses a method for creating arrangement of damages for producing 3D laser-induced damage portraits with the space resolution, which is equal to the appropriate computer 3D model.

U.S. Pat. No. 6,664,501 to Troitski discloses a method for creating laser-induced color images within three-dimensional transparent material.

U.S. Pat. No. 6,670,576 to Troitski et al. discloses a method for producing laser-induced images inside transparent materials containing laser-induced color centers and laser-induced damages.

U.S. Pat. No. 6,720,521 to Troitski discloses a method for generating an area of laser-induced damage inside a transparent material by controlling a special structure of a laser radiation.

U.S. Pat. No. 6,720,523 to Troitski discloses a method for production of laser-induced images inside transparent material, when complete image information is lacking before production and is supplemented only during production.

U.S. Pat. No. 6,727,460 to Troitski discloses a system for high-speed production of high quality laser-induced damage images inside transparent materials. The system produces the said images by the combination of an electro-optical deflector and means for moving the article or focusing optical system.

U.S. Pat. No. 6,734,389 to Troitski discloses an apparatus for producing high quality laser-induced images inside optically transparent material by controlling breakdown process development and space structure of laser radiation.

U.S. Pat. No. 6,740,846 to Troitski et al. disclose a method for producing 3D laser-induced portrait by using several 2D regular portraits.

Analyzing the methods and apparatus disclosed in US Patents and other publications, we can make the following conclusion:

Two kinds of marks are used for production laser-induced images inside transparent materials: laser-induced damages appearing as a result of the breakdown and laser-induced etch points appearing as a result of photoionization. The last etch points is also named as color centers. These marks have different optical characteristics: the laser-induced damages scatter the light but color centers absorb the exterior light.

Laser-induced marks, which are used for creation of images on the surface, are created as result of the ablation of the material from its surface.

This situation has the following disadvantages:

the use of different physical effects for creation of marks inside and on surface of transparent material demands to use different laser system for production of internal and surface marks;

the substantial removal of transparent material from its surface destroys the surface and make worse visibility of internal points of the image.

The purpose of the present invention is the disclosure of a method and a system, which are able to produce laser-induced images containing both internal and surface points and which create the surface points under minimal (or without) surface transparent material removal.

SUMMARY OF THE INVENTION

The present invention has its principal task to provide a method for creating laser-induced marks inside a transparent material and on its surface by using the same apparatus.

One or more embodiments of the invention comprise a method for producing laser-induced images comprising both internal etch points and laser-induced marks placed on a transparent material surface.

One or more embodiments of the invention comprise a method for producing laser-induced marks on a surface of transparent material as the frost areas created by the laser-induced plasma generated as a result of focusing laser radiation not in the surface points but in the environment points distant from the material surface.

One or more embodiments of the invention comprise a method for producing the frost surface areas of desirable optical characteristics by using plasma of special parameters generated during breakdowns.

One or more embodiments of the invention comprise a method and a system for the control of plasma characteristics generated during breakdowns so as the parameters of the frost areas arisen under interaction of the plasma with the surface of the transparent material have desirable values.

DETAILED DESCRIPTION OF THE INVENTION

Figure 1:
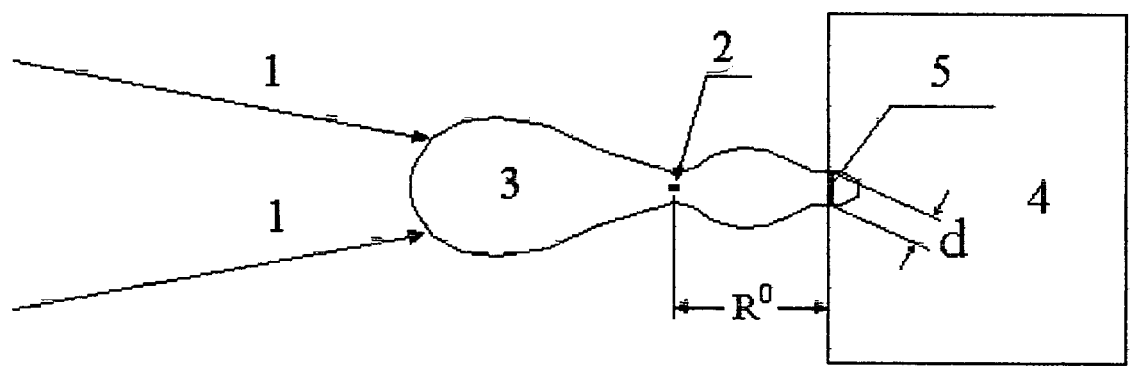
FIG. 1 is the schematic representation of breakdown in air and creation of frost area on the surface of transparent material: laser beam 1 (the arrows indicate the direction of the laser light) is focused at spot 2; spark 3 is generated by the air breakdown; $R^0$ is distance between focal spot and the surface of transparent material 4; d is the size of mark area 5.

The invention comprises methods and apparatus for generating laser induced-marks inside transparent materials and on their surface for producing high quality images comprising multiples of such points. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention relates to methods in which laser energy is utilized to generate visible points or areas inside and on surface of an object by laser-induced breakdown phenomena. Such points may be referred to as "etch" points. Preferably, the object comprises glass through which may be viewed the created etch points. Multiple of such etch points may be utilized to generate or produce a visible image.

To provide a better understanding of the essence of the method of the present invention it is expedient first to consider the breakdown process and general dynamical phenomena, which attendant to it. Laser-induced damage occurs when the laser irradiance exceeds a certain threshold energy value, which is characteristic of the material (or the environment) where the laser beam is focused. When the threshold energy value is exceeded, a plasma condition is generated in a focal spot. The breakdown process development and the kind of interaction of laser radiation with the transparent material depend on the place, where laser beam is focused: inside the said material, on its surface or near to the material surface. Since our task is disclosure of methods for creating etch points inside and on surface of transparent material, it is important to take into account the general processes attending the breakdown inside transparent material on its surface and in air or in another environment surrounding the material.

The process of laser-induced damage development inside a transparent material, how it was described in U.S. Pat. No. 6,399,914 to Troitski, has several stages:

1) Creation of an initial low-density free electron concentration.
2) Buildup of this electron concentration until a density of $10^{18}$ to $10^{19}$ cm$^{-3}$ is reached.
3) Absorption of the remainder of the laser pulse by the resulting plasma.
4) An increase in temperature to a value of several thousands of degrees.
5) The generation of an initial thermally-induced sound wave which is the response of the medium following the thermal expansion of the central region during the laser heating pulse, which sound wave propagates outward.
6) The expansion of created liquid at a rate much slower than the speed of sound.
7) The generation of a pressure-induced sound wave as the liquid forms higher pressure with gradients of the order of several GP a/μm.
8) The formation of cracks at the liquid/solid interface (velocities in the range of 1 to 2 km/s).

Thereby the breakdown plasma generates a shock wave, which causes a cleavage inside the uniform transparent material in this case a laser-induced damage is a bubble, which scatters the light. Hence, a shock wave is one of the general factors which create marks inside a transparent material.

Surface damage can occur at lower value of laser irradiance that volume damage. One mechanism postulated for breakdown of glass surfaces was suggested by the observation that chemical treatment can raise the threshold for damage (John F. Ready "Effects of High-Power Laser Radiation", Academic Press, 1971, page 302) The mechanism essentially involves the following steps:

a) absorption of laser light in OH radicals present on the surface and linked by H bonds, resulting in fluorescence;
b) quenching of the fluorescence, resulting in a chemical reaction;
c) an increase in the local field strength because of the chemical reaction;
d) breakdown.

It is obvious, in contrast to an internal mark; a surface damage is created in non uniform environment: from one side, it is transparent material, from another side, it is air. As a result of this, a shock wave generated by breakdown removes a lot of material and surface of the transparent material become "pock-marked". Another disadvantage of such marks is the difficulty to control the material mass, removed from the surface that in its turn does not a chance to control the optical characteristics of these marks. However, as it was mentioned above, it is possible using special treatment of surface to decrease the breakdown threshold. Control for the breakdown threshold value gives a chance to decrease the shock wave and in that way to control the quantity of mass removed from the surface.

The laser-induced breakdown in air has the following features. The breakdown attends appearing a bright blue-white source of light (spark), radiating approximately uniformly. The spark elongates along the direction of the incoming light beam. When the geometry of focal spot is changed, the characteristics of the breakdown region may change. A general feature of the spark development is the asymmetric growth. The spark spreads backwards, toward the laser, moving with an initial velocity of the order of $10^7$ cm $sec^{-1}$. The expansion back toward the laser essentially fills the converging cone of laser radiation. A shock wave propagates into the undisturbed gas and absorption of energy from the laser beam drives the shock wave, causing it to spread. The shock velocity is different for different directions. The longitudinal velocity is much higher than the transverse velocity during the time in which light energy is being absorbed. Toward the end of the laser pulse, the two velocities approach the same value. At small values of time, the shock front and the luminous front proceed approximately at the same velocity, but near the time of the maximum of laser intensity, the shock front separates from the luminous front. Radiation emitted from the laser-produced spark covers the visible, ultraviolet, and soft x-ray regions of the spectrum. The plasma temperature is an increasing function of the irradiance so that very high temperatures can be produced.

Thereby, producing breakdown in the air near material surface, we create several different factors which can be used for making marks on the surface of the material. More important from them are: the shock front, the luminous front, plasma front, heating and radiation emitted from the spark. The parameters and characteristics of the factors depend on the parameters and characteristics of laser-induced plasma. Consequently, controlling the development of breakdown, it is possible to control the development of all processes attended the breakdown. As a result it is possible to find such correlation between surface bursting and material removal so that a surface transparent material mark, produced by the factors, looks as the frost area, the size of which is determined by the shape of plasma area and its transparency is determined by the plasma intensity. All physical effects mentioned above show the advantages of surface mark production by creating breakdown near surface but not on the surface.

One or more embodiments of the invention comprise a method for creating a frost area on the surface of transparent material or opaque material by laser-induced plasma generated in the air or another environment in which the material is placed. The plasma should be generated in the environment points near the material. The coordinates of the environment point are determined in such a way that the surface mark is produced on the desirable surface place. The optical characteristics (like transparency) and structure (like matte) of the mark area are controlled by energy parameters of plasma, time period during of which the plasma exists, velocities of shock front and luminous front. The sizes and shape of the mark is controlled by the sizes and the shape of focal spot. Additional control of geometrical parameters of the surface mark is produced by the variation of the environment point distance from the surface of the material.

FIG. 1 illustrates dependence of mark sizes from the shape of spark and distance $R^o$ between focal spot and transparent material surface. The value $R^o$ determines what kinds of processes (shock front, the luminous front, plasma front, heating and radiation emitted from the spark) play general role in interaction with the material.

However, more effective control for creating surface mark area is provided by controlling plasma formation during breakdown. Minimization of shock wave influence (and consequently, minimization of material mass removal) can be reached by using laser radiation, the energy of which exceeds the air breakdown threshold by a negligible margin so as to create a plasma condition, and thereafter a smaller level of energy is applied to maintain the plasma state. Additional opportunities of controlling brightness of the spark and diminution of shock wave are opened by decrease of breakdown threshold. It can be reached by dispersion (atomization) in air special microscopical impurities.

A method for creating the frost area on a material surface by the laser-induced plasma generated in the air is as follows:

Step 1. Coordinates of environment point where the plasma should be generated in the air to create a mark on the desirable place of the treated material surface are determined.

Step 2. The shape and sizes of focal spot is determined so as to create the laser-induced plasma formation of desirable shape.

Step 3. The distance of the material surface from the geometrical focus is determined so as the frost area has desirable sizes.

Step 4. For coordinates of environment point, the shape and sizes of focal spot and the distance of the material surface from the geometrical focus, which have been determined on Steps 1–3, characteristics of plasma formation (velocity of shock front, the luminous front and plasma front, plasma temperature, time needed for existing plasma and intensity of radiation emitted from the spark) are determined so as to create a frost area of desirable optical characteristics.

Step 5. Parameters of laser radiation are determined so that plasma formation has the characteristics determined on the Step 4.

Step 6. Laser radiation is generated so as being focused at the predetermined environment point of the air and being controlled during plasma formation it creates the frost area of the desirable optical characteristics.

Other embodiments of the invention comprise a method in which a surface material mark is produced by laser-induced breakdown created in the special liquid. The surface is wetted by thin layer of the transparent liquid covering the surface. The breakdown is produced inside the liquid layer. The phenomena are apparently related to the same mechanisms that produce damage in solids. The use of the special liquid enables to decrease the breakdown threshold, to reduce pressure of shock wave and decrease the mass material removal.

Other embodiments of the invention comprise a method in which a surface material mark is produced by laser-induced breakdown created not far from the surface in the environment which is a mixture of air and exhalation of special liquid. The value of breakdown threshold in the environment can be also essentially decreased and in such a way the mass material removal can be reduced.

Other embodiments of the invention comprise a method in which a surface material mark is produced by laser-induced breakdown created in the air not far from the surface in which special microscopically impurities are disseminated. The kind of the impurities is picked out so as to decrease the breakdown threshold.

Other embodiments of the invention comprise a method in which a surface material mark is produced by laser-induced breakdown created on the material surface. The surface is treated so as to reduce the breakdown threshold and in such a way to decrease the mass material removal.

One or more embodiments of the invention comprise a method for controlling parameters of the frost area by controlling laser-induced plasma formation not far from the material surface, including:

controlling the shape and sizes of the spark area by choosing the geometrical parameters of focal spot;
controlling the distance between the focal spot and the material surface;
controlling the breakdown threshold value;
controlling the time of plasma existing;
controlling the spark brightness;
controlling the energy of laser radiation needed for plasma maintaining.

One or more embodiments of the invention comprise a method for producing laser-induced images inside transparent material and on its surface using breakdown is as follows:

Step 1. An image is transformed into point arrangement, which should be produced inside and on surface of the transparent material.

Step 2. The said point arrangement is divided into two parts: the first comprises points which should be produced inside transparent material; the second comprise the points which should be produced on its surface.

Step 3. The part of point arrangement, which contains internal points, is transferred in such a way that distances between adjacent points increase the threshold distance value (the minimal distance, when the internal crash is not happened).

Step 4. The points of both parts of point arrangement are regulated so as the marks which have been already produced do not prevent for production of the rest etch points.

Step 5. The values of breakdowns thresholds for the transparent material and for environment surrounding the material are determined.

Step 6. The laser radiation capable to create the laser-induced plasma with parameters providing the production of desirable internal damages is focused inside the transparent material in the predetermined points of the first part of the point arrangement.

Step 7. The laser radiation capable to create the laser-induced plasma with parameters providing the production of desirable surface frost areas is focused in the predetermined environment points of the first part of the point arrangement.

Figure 2:
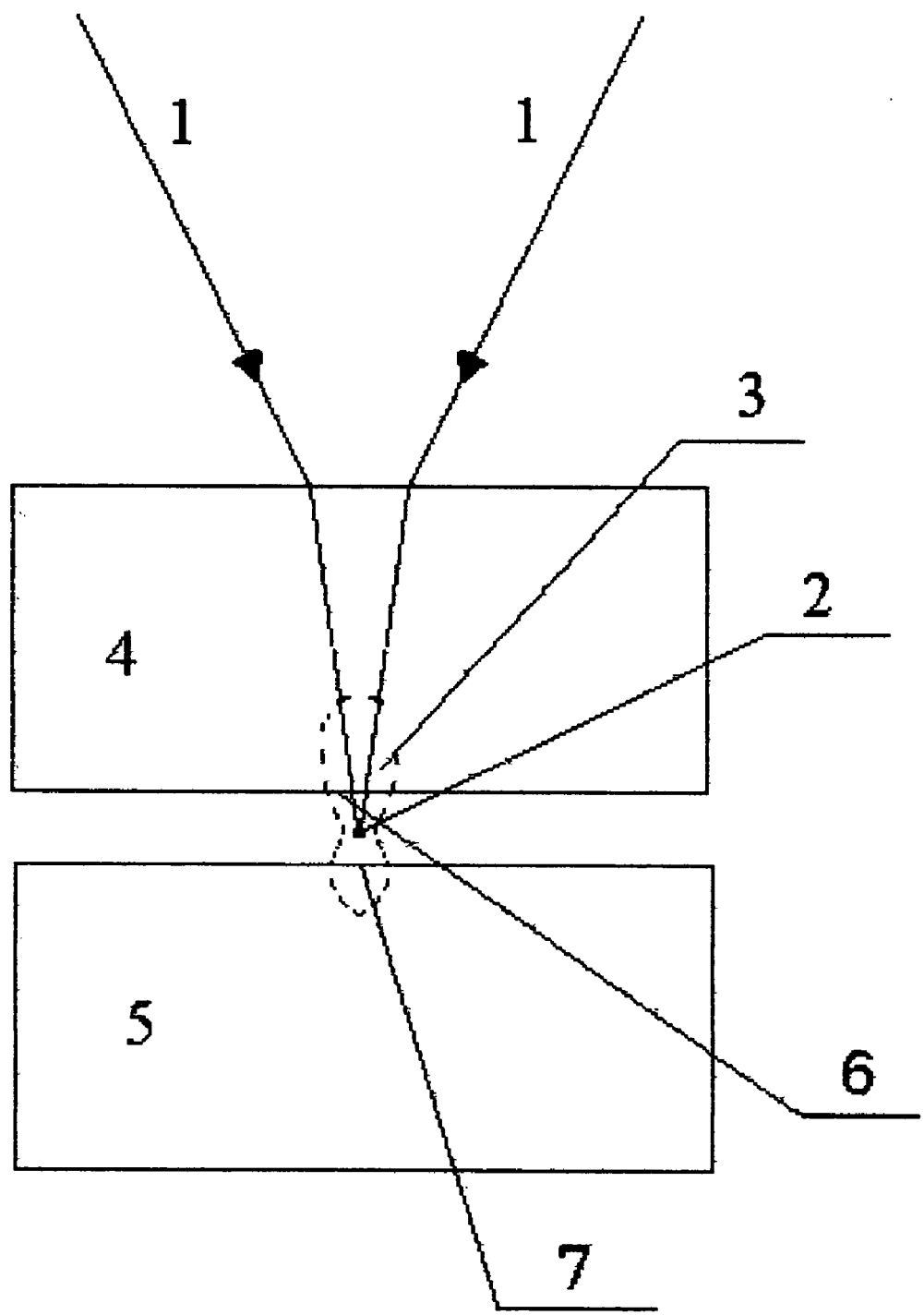
FIG. 2 is the schematic representation of simultaneous production of two etch points on surface of two different transparent materials: the laser beam 1 (the arrows indicate the direction of the laser light) passes through the transparent material 4 and is focused at spot 2; spark 3 is generated by the breakdown between two transparent materials; mark area 6 is on the surface of the transparent material 4; mark area 7 is on the transparent surface of material 5.

Other embodiments of the invention comprise a method in which a surface material marks are produced simultaneously on two surfaces of different transparent materials. FIG. 2 illustrates typical diagram of the method. Laser beam 1 passes through transparent material 4 and is focused at the spot 2. Laser-induced plasma generated by the breakdown between two transparent materials creates frost areas 6 and 7 corresponding on the surface of transparent materials 4 and 5. Space between these transparent materials can be air or is filled up another transparent environment (for example, liquid).

One or more embodiments of the invention comprise a system for producing laser-induced images inside transparent material and on its surface using the laser-induced plasma formation comprising:

means for transformation of image into point arrangement and division the said point arrangement into two parts: the first contains points which should be produced inside the transparent material; the second contains points which should be produced on the surface of the transparent material;

means for transformation of the first point arrangement part into internal point arrangement so as distances between adjacent points exceed threshold distance value (otherwise, internal crash of the transparent material can be happened);

means for determination of the coordinates of the environment points (in the air or another environment in which the said transparent material is placed) where plasma should be generated to create the frost areas appropriating to the surface point arrangement;

means for determination of plasma parameters needed for creation of desirable frost areas;

means for determination of laser radiation parameters needed for generation of laser-induced plasma with demanded parameters;

means for focusing laser radiation at the predetermined points inside transparent material and means for focusing laser radiation at the predetermined environment points;

means for controlling focusing laser radiation at the predetermined points of the said internal point arrangement so as damages which have been already produced inside the transparent material do not prevent to produce the rest etch points;

means for generating laser radiation so as laser energy at the focused spots exceeds the breakdown threshold;

means for controlling generation of laser radiation so as laser beam focused in internal points has energy which exceeds the breakdown threshold of the transparent material; laser beam focused in the environment exceeds the breakdown threshold of the environment;

means for controlling distances between the predetermined points of the said environment point arrangement and the surface of the transparent material;

means for controlling environment parameters.

Other embodiments of the invention comprise a method in which laser-induced etch points placed inside transparent materials and on its surface are produced by the same laser. Laser radiation energy is only one laser parameter which should be controlled during production of internal or surface points. Internal etch points are produced by focusing laser radiation in these points but surface etch points are produced by focusing laser beam in points which do not coincide with the desirable mark areas but are placed close to the areas in the environment.

We claim:

1. A method for creating laser-induced images inside transparent material and on its surface using breakdown phenomenon comprising:

transformation of image into point arrangement so that distances between adjacent points which should be produced inside the said material exceed threshold distance value;

division of the said point arrangement on internal point arrangement, points of which are inside the said material, and surface point arrangement, points of which belong to the said surface;

determination of the environment points (of the air or another environment in which the said transparent material is placed) in which plasma should be generated to create the frost areas according to the surface point arrangement;

determination of plasma parameters needed for creation of desirable frost areas;

generating laser radiation and focusing it at the predetermined points of the said internal point arrangement so that laser energy at the focused spots exceeds the breakdown threshold of the said material and so that damages which have already produced do not prevent to produce the rest etch points;

generating laser radiation and focusing it at the predetermined environment points so that laser energy at the focused spots generates laser-induced plasma of predetermined parameters.

2. A system for producing laser-induced images inside transparent material and its surface using the laser-induced plasma formation comprising:

means for transformation of image into point arrangement and division the said point arrangement into two parts: the first contains points which should be produced inside the transparent material; the second contains points which should be produced on the surface of the transparent material;

means for transformation of the first point arrangement part into internal point arrangement so as distances between adjacent points exceed threshold distance value;

means for determination of the coordinates of the environment points (in the air or another environment in which the said transparent material is placed) where plasma should be generated to create the frost areas appropriating to the surface point arrangement;

means for determination of plasma parameters needed for creation of desirable frost areas;

means for determination of laser radiation parameters needed for generation of laser-induced plasma with demanded parameters;

means for focusing laser radiation at the predetermined points inside transparent material and means for focusing laser radiation at the predetermined environment points;

means for controlling focusing laser radiation at the predetermined points of the said internal point arrangement so as damages which have been already produced inside the transparent material do not prevent to produce the rest etch points;

means for generating laser radiation so as laser energy at the focused spots exceeds the breakdown threshold;

means for controlling generation of laser radiation so as laser beam focused in internal points has energy which exceeds the breakdown threshold of the transparent material; laser beam focused in the environment exceeds the breakdown threshold of the environment;

means for controlling distances between the predetermined points of the said environment point arrangement and the surface of the transparent material.

3. The system in accordance with claim 2 wherein the same pulse laser generates radiation able to create the breakdown both inside the transparent material and inside the environment.

4. A method for creation of mark areas on the transparent surfaces wherein two transparent materials are placed so that laser-induced breakdown is produced between their surfaces and breakdown plasma creates marks on both surfaces simultaneously.

5. The method in accordance with claim 4 wherein control of the mark areas on the transparent surfaces is provided by changing the distances between the points at which plasma is generated and the surfaces of the said transparent materials.

6. The method in accordance with claim 4 wherein the area, inside which breakdowns are created, is liquid.

* * * * *